United States Patent
Van Druten et al.

(10) Patent No.: US 11,760,439 B2
(45) Date of Patent: *Sep. 19, 2023

(54) BICYCLE TRANSMISSION WIRELESS ACTUATION SYSTEM

(71) Applicant: Advancing Technologies B.V., Eindhoven (NL)

(72) Inventors: Roëll Marie Van Druten, Eindhoven (NL); Johannes Gijsbertus Antonius Van Den Brand, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/608,495

(22) PCT Filed: Apr. 26, 2018

(86) PCT No.: PCT/NL2018/050277
§ 371 (c)(1),
(2) Date: Oct. 25, 2019

(87) PCT Pub. No.: WO2018/199761
PCT Pub. Date: Nov. 1, 2018

(65) Prior Publication Data
US 2020/0189690 A1   Jun. 18, 2020

(30) Foreign Application Priority Data

Apr. 27, 2017   (NL) ...................................... 2018801

(51) Int. Cl.
*B62M 25/08*   (2006.01)
*B62K 25/02*   (2006.01)
(Continued)

(52) U.S. Cl.
CPC .............. *B62M 25/08* (2013.01); *B62J 45/41* (2020.02); *B62J 45/42* (2020.02); *B62J 45/423* (2020.02);
(Continued)

(58) Field of Classification Search
CPC .. B62M 25/08; B62M 2025/006; B62M 9/10; B62M 11/16; B60B 27/026;
(Continued)

(56) References Cited

U.S. PATENT DOCUMENTS 5,213,548 A   5/1993   Colbert
5,358,451 A   10/1994   Lacombe et al.
(Continued)

FOREIGN PATENT DOCUMENTS

CN   2015-70886 U   9/2010
CN   103723238 A    4/2014
(Continued)

OTHER PUBLICATIONS

Define short range wireless connection, Google Search, Feb. 12, 2021 (Year: 2021).*

(Continued)

*Primary Examiner* — Vinh Luong
(74) *Attorney, Agent, or Firm* — Pillsbury Winthrop Shaw Pittman, LLP

(57) ABSTRACT

Bicycle including a frame with a fork, the fork having dropouts between which a wheel axle is mounted. The wheel axle includes a sensor and/or an electric component arranged to be connected to a control element. A detachable electric connection is provided between the sensor and/or electric component and the control element. The detachable electric connection includes a short range wireless connection.

11 Claims, 10 Drawing Sheets

(51) Int. Cl.
*B62J 45/41* (2020.01)
*B62J 45/42* (2020.01)
*B62J 45/423* (2020.01)
*B62M 25/00* (2006.01)

(52) U.S. Cl.
CPC ....... B62K 25/02 (2013.01); *B62M 2025/006* (2013.01)

(58) Field of Classification Search
CPC . B60B 27/065; B60B 27/023; B60B 27/0015; B60B 35/04; H04B 5/0043; B62K 25/02; B62K 3/02
See application file for complete search history.

(56) References Cited

U.S. PATENT DOCUMENTS

| | | | |
|---|---|---|---|
| 6,204,775 | B1 | 3/2001 | Kubacsi |
| 8,909,424 | B2* | 12/2014 | Jordan .................. H04W 74/08 701/51 |
| 9,221,516 | B1 | 12/2015 | Song |
| 9,394,030 | B2 | 7/2016 | Shipman et al. |
| 9,616,964 | B2 | 4/2017 | Kasai |
| 2005/0285461 | A1 | 12/2005 | Kitamura |
| 2009/0031841 | A1 | 2/2009 | Tetsuka |
| 2009/0315692 | A1* | 12/2009 | Miki ..................... B62K 23/02 340/432 |
| 2013/0049447 | A1 | 2/2013 | Kitamura |
| 2013/0145885 | A1 | 6/2013 | Kitamura et al. |
| 2014/0102237 | A1 | 4/2014 | Jordan et al. |
| 2014/0222268 | A1 | 8/2014 | Tsuchizawa |
| 2014/0235383 | A1 | 8/2014 | Wesling |
| 2015/0311954 | A1* | 10/2015 | Tetsu ..................... H02J 7/025 307/104 |
| 2016/0311499 | A1 | 10/2016 | Kasai |
| 2016/0347414 | A1 | 12/2016 | Niki |
| 2016/0362160 | A1 | 12/2016 | Van Druten et al. |
| 2016/0368318 | A1* | 12/2016 | Van Druten .......... B60B 27/065 |
| 2017/0012455 | A1 | 1/2017 | Kato et al. |
| 2017/0158285 | A1 | 6/2017 | Tachibana |
| 2017/0203814 | A1 | 7/2017 | Kurokawa |
| 2018/0057107 | A1* | 3/2018 | Yamamoto ................ B62L 5/00 |
| 2018/0178881 | A1* | 6/2018 | Miglioranza .......... B62M 9/122 |
| 2018/0244345 | A1* | 8/2018 | Yamaguchi ............ B62M 9/122 |
| 2018/0257736 | A1* | 9/2018 | Komatsu ................ B62K 25/08 |
| 2018/0354586 | A1* | 12/2018 | Komatsu .............. B62M 9/1242 |
| 2019/0118901 | A1* | 4/2019 | Nago ........................ B60T 1/10 |
| 2020/0062345 | A1* | 2/2020 | Shahana ............... B62J 45/4152 |
| 2020/0156739 | A1* | 5/2020 | Van Druten ........... B62M 25/08 |
| 2021/0188394 | A1* | 6/2021 | Shahana ................ B62M 9/123 |
| 2021/0197015 | A1* | 7/2021 | Anderson ............ A63B 21/015 |
| 2021/0331760 | A1* | 10/2021 | Fujimura .............. H01C 13/00 |

FOREIGN PATENT DOCUMENTS

| | | | | |
|---|---|---|---|---|
| CN | 105015696 | A | 11/2015 | |
| CN | 204998713 | U | 1/2016 | |
| CN | 205105041 | U | 3/2016 | |
| CN | 103661773 | B | 4/2016 | |
| CN | 105793152 | A | 7/2016 | |
| CN | 106184600 | A | 12/2016 | |
| EP | 1426285 | B1 | 8/2011 | |
| EP | 3115250 | A1 | 1/2017 | |
| EP | 3696072 | A1 * | 8/2020 | ............ B62M 25/08 |
| TW | I313663 | | 12/1992 | |
| TW | I538846 | B | 6/2016 | |
| WO | 2015/130175 | A1 | 9/2015 | |
| WO | WO 2015130174 | A1 * | 9/2015 | ............ B62M 25/08 |
| WO | 2018/199761 | A1 | 11/2018 | |

OTHER PUBLICATIONS

Define electric component, Google Search, Jan. 7, 2021 (Year: 2021).*
International Search Report dated Aug. 20, 2018 issued in corresponding International Patent Application No. PCT/NL2018/050277 (5 pgs.).
Office Action dated Dec. 28, 2020 issued in corresponding Chinese Patent Application No. 201880043429.5 with English translation (18 pgs.).
Define position sensor, Google Search, Jan. 16, 2021 (Year 2021).
Extended European Search Report dated Jul. 20, 2020, issued in corresponding European Patent Application No. 19203684.6 (11 pgs.).
Search Report and Written Opinion dated Jun. 24, 2019, issued in corresponding Netherlands Application No. NL 2021822 (15 pgs.).
Office Action dated Oct. 19, 2021, issued in corresponding Chinese Patent Application No. 201880043429.5 (9 pgs.).
User Manual for Mavic Mektronic system, MAVIC, 1998 (10 pgs.).
Demonstrator Document AE 27410, "Wireless Bike Rear Derailleur System", MAVIC, Oct. 17, 1999 (22 pgs.).

* cited by examiner

BICYCLE TRANSMISSION WIRELESS ACTUATION SYSTEM

CROSS-REFERENCE TO RELATED APPLICATIONS

This application is the U.S. National Stage of PCT/NL2018/050277, filed Apr. 26, 2018, which claims priority to: Netherlands Patent Application No. 2018801, filed Apr. 27, 2017, the entire contents of each of which are herein incorporated by reference in their entireties.

FIELD OF THE INVENTION

The invention relates to bicycle transmission actuation systems. More in general the invention relates to bicycle transmissions.

BACKGROUND TO THE INVENTION

Bicycle transmission systems are known. Bicycle transmission system can include a gear shifting mechanism. The gear shifting can be discrete or continuously variable. In some varieties, a gear shifting mechanism is included in or attached to a driven axle of the bicycle. It is known to actuate gear shifting by electronically actuated actuators. Electronically actuated actuators can be cumbersome in that power supply and/or signal supply needs to be extremely robust and stable to avoid malfunction of the gear shifting mechanism. Yet in many applications weight and or space allowed for electronically actuated actuators and/or power and/or signal supply is limited. In general supplying power and/or signals to/from electric components included in or attached to a driven axle of a bicycle can be cumbersome.

SUMMARY OF THE INVENTION

It is an object to obviate, or at least diminish, one or more of the disadvantages mentioned above.

Alternatively, or additionally, it is an object to provide a system for transmitting power and/or signals to and/or from an electric component, such as an actuator, electric motor, sensor or the like, included in or attached to a wheel axle of a bicycle.

The electric component can e.g. enable gear shifting between a driver component (such as a sprocket, cassette or pulley) and a hub of the wheel axle. Thereto the electric component may require electric power for gear shifting of a gear shifting system. The electric component may also require a signal for determining a gear shifting direction and/or amount. It is possible that the electric component transmits power or a signal outwardly of the wheel axle.

The wheel axle can be arranged to be detachably mounted to a frame of the bicycle. The bicycle can include a frame with one or two forks. The frame can include a front fork for attachment of a front wheel and/or a rear fork for attachment of a rear wheel. The fork(s) include dropouts. For attaching and/or exchanging the wheel a thru-axle (also referred to as through-axle) can be used which can be inserted through the frame (at least one dropout) and through the wheel axle. Since the electric component is included in or attached to the wheel axle, a detachable electric coupling is desired between the electric component in or on the wheel axle and a control element and/or power supply element that usually is placed on or in the frame or the handlebars of the bicycle.

This detachable electric coupling can be formed by a wireless or contactless connection so that there are no electric contacts that can disconnect because of debris or moisture (water). The wireless or contactless connection can be a short range wireless connection.

According to an aspect is provided a wheel axle assembly, including a wheel axle including a sensor and/or an electric component arranged to be connected to a control element. A detachable electric connection is provided between the sensor and/or electric component and the control element. The detachable electric connection includes a short range wireless connection.

According to an aspect is provided a bicycle including a frame with a fork, the fork having dropouts between which a wheel axle is mounted wherein the wheel axle includes a sensor and/or an electric component arranged to be connected to a control element. A detachable electric connection is provided between the sensor and/or electric component and the control element. The detachable electric connection includes a short range wireless connection.

Optionally, a direct wireless coupling between the electric component in or on the wheel axle and a control element on the handlebars is provided. This may be difficult to realize since in and around a wheel axle generally a lot of metal is present that can disturb wireless signals.

According to an aspect electric power and/or information is provided to the electric component in or attached to the wheel axle via a contactless electric coupling.

According to an aspect the thru-axle is used for providing the contactless electric coupling between the electric component in or attached to the wheel axle and the power supply and/or control element.

Optionally, the thru-axle is provided with a first transmitter for transmitting electric power and/or signals to the wheel axle. The wheel axle can be provided with a first receiver for receiving electric power and/or the signals from the first transmitter. Thereto the thru-axle can be provided with a first coil as part of the first transmitter and the wheel axle can be provided with a second coil as part of the first receiver. It will be appreciated that part of the first transmitter can be attached to the frame. The first and second coils can be sealed against debris and/or water. The first and second coils are positioned such that when the thru-axle is inserted in the wheel axle in the position for securing the wheel in the frame, the first and second coils are axially positioned relative to each other such that a coupling can be achieved at high efficiency, e.g. at maximum efficiency. It will be appreciated that the coils will be coupled inductively. However, since the inductively coupled coils are able to transmit electric power and/or electric signals from one coil to the other, the coupling between the coils is herein also referred to as electric coupling.

Optionally, the first transmitter is wiredly or wirelessly connected to the control element.

For increasing efficiency of transfer of power and/or signal between the coils a ferrite layer can be placed adjacent a radially inner side of the first coil, a radially outer side of the second coil and/or the axial sides of the coils.

For increasing efficiency of the transfer of power and/or signal between the coils a middle frequency resonance of the signal on the order of 100 kHz can be used over the coils.

According to an aspect, the system is arranged for transferring both power and signal between the coils, in one direction or in both directions.

According to an aspect a first energy storage element, such as a battery, is included in or attached to the thru-axle. A second energy storage element, such as a battery, can be included in or attached to the wheel axle. The first energy storage element can be arranged for providing the first coil with energy. The second energy storage element can be arranged for providing the second coil with energy.

Optionally, the first energy storage element has a storage capacity that is at least ten (10) times the storage capacity of the second energy storage element.

Optionally the system is arranged for charging the second energy storage element using energy stored in the first energy storage element. Hence, the second energy storage element can be maintained in a state of sufficient charge. Thereto energy can be transferred from the first energy storage element to the second energy storage element via the first and second coils.

The system can be arranged for providing energy to an actuator and/or sensor included in or attached to the wheel axle from the second energy storage element. The system can be arranged for providing energy to an actuator and/or sensor included in or attached to the wheel axle from the first energy storage element.

The system can be arranged for transferring a signal determining an actuation direction and/or amount for the actuator included in or attached to the wheel axle via the first and second coils. The system can be arranged for transferring a signal from the control element (e.g. on the handlebars) to the thru-axle. Signal transfer from the control element (e.g. on the handlebars) to the thru-axle can be wireless. A second wireless receiver or transceiver can be included in or attached to the thru-axle. The second transceiver or receiver is herein further referred to as second receiver, nevertheless still covering the possibility of it being a transceiver. The second wireless receiver can be mounted to the thru-axle so as to extend outside the wheel axle and outside the frame to reduce disturbance of wireless communication by metal parts of the wheel axle and/or frame. The system can be arranged for providing the second receiver with electric power from the first energy storage element.

It will be appreciated that when exchanging the wheel (and thus the wheel axle), the thru-axle can remain with the frame so that a pairing between the control element and the second receiver in/on the thru-axle can be maintained. Therefore, when exchanging the wheel no time is lost on pairing the control element with the replacement wheel.

The pairing of the control element, e.g. of a wireless transmitter of the control element, with the second receiver in/on the thru-axle can be performed, e.g. once when matching the thru-axle with the frame.

It will be appreciated that it suffices to recharge the first energy storage element, e.g. by external charging, e.g. using an electric charging apparatus. The second energy storage element can be charged from the first energy storage element. Since the first energy storage element is included in or attached to the thru-axle, it can easily be charged e.g. via a connector on the thru-axle. Charging can be performed while leaving the thru-axle in the bicycle or with the thru-axle removed from the bicycle. Optionally, the first coil can be used for charging the first energy storage element, e.g. via an external charger, e.g. including a third coil.

The system can be arranged such that the first energy storage element automatically charges the second energy storage element so that the second energy storage element can always provide the actuator with electric power. In this way also the user never needs to charge or replace the second energy storage element. This provides a big advantage as the second energy storage element can be difficult to reach since it is mounted in or attached to the wheel axle, and because parts in the neighborhood of the second energy storage element can rotate (e.g. wheel hub and/or driver).

According to an aspect an electric generator is included in or attached to the wheel axle for charging the second energy storage element. The generator can be driven by rotation of the hub and/or driver. Alternatively, or additionally, the generator can be arranged fro generating electric energy on the basis of vibrational energy.

Optionally the first energy storage element includes one or more, such as two, AAAA (LR61) batteries that can be rechargeable and/or replaceable.

According to an aspect a control unit can be included in or on the thru-axle. The control unit can be arranged for receiving control signals from the control element. The control unit can be arranged for converting input signals received from the control element into signals to be transmitted to the first receiver. The control unit can be arranged for indicating a current direction and/or current level to be transmitted by the first transmitter to the first receiver.

According to an aspect an actuator control unit is included in or attached to the wheel axle for controlling the actuator of the wheel axle. The actuator control unit can be arranged for controlling an electric current direction and/or an electric current amount and/or an electric current duration to the actuator. The actuator control unit can also be arranged for controlling a current, e.g. limiting a current to the actuator.

Optionally, the one or more of the actuator, the actuator control unit, the second coil and the second energy storage element are mounted to a bracket 38 that has a hole 40 therein, the bracket forming part of or being connected to the wheel axle, e.g., via hole 42 in the axle. Hence, the electronics can easily be mounted to the wheel axle.

Optionally, the first receiver is powered with electric power received from the first transmitter. Even then, the second energy storage element can be present for providing electric power to the electric component, such as the actuator for gear shifting.

Optionally, the first transmitter is mounted to a dropout of the frame. Alternatively, if a rear derailleur is available, the first transmitter can be mounted to the rear derailleur.

The control element can be an electronic switch actuatable with a rotary button or push button. Optionally, the electronic switch is arranged to be actuated via a cable extending from a mechanical switch (shifter), e.g. mounted on the handlebars. Hence, standard mechanical switches (shifters) can be used for actuating the electric component on/in the wheel axle.

Optionally, a connection between the control element, e.g. the electronic switch, and the first transmitter is a wired or wireless connection. The power supply element for power supply of the first transmitter can be mounted adjacent to the first transmitter, adjacent to the switch or somewhere in between, e.g. inside the frame of the bicycle.

By using a short range wireless system for the first transmitter and first receiver, no pairing of the first transmitter and first receiver is required. Any wheel, with a first receiver, that is placed in the frame can immediately be controlled by the first transmitter and first receiver, without a pairing procedure. This can be of great advantage for a fast wheel exchange.

In case an electrically switching rear derailleur is used, the first transmitter of the short range wireless system can be placed close to an electric component, such as an actuator, of the rear derailleur. In case the rear derailleur is also actuated wirelessly, a third receiver of the rear derailleur can be placed in one housing together with the first transmitter of the short range wireless system. A battery used for the rear derailleur can then supply power to the third receiver of the rear derailleur, the actuator of the rear derailleur and the first transmitter of the short range wireless system. Hence, fewer batteries are required.

According to an aspect the electric component has only two modes between which can be switched. The electric actuator can e.g. have only two positions between which can be switched. Optionally, the component is arranged such that the switching direction is determined by an electric current direction (or voltage polarity) to the component. Hence it can be possible to switch from one mode to the other by reversing the current direction (or voltage polarity). Hence, a separate control signal may not be required for determining the switching direction.

According to an aspect is provided a bicycle including a frame with a fork, such as a front form and/or a rear fork, the fork having dropouts between which a wheel axle of a driven wheel is mounted. The wheel axle includes a switchable transmission between a driver and a wheel hub of the wheel. The transmission includes a switching mechanism with an electric component, such as an actuator, arranged to be actuated by a control element that is wiredly or wirelessly connected to the electric component. The electric component can be switched to be in one of two modes and the control element is arranged for reversing a supply current direction to the electric component for switching.

It will be appreciated that any one or more of the above aspects, features and options can be combined. It will be appreciated that any one of the options described in view of one of the aspects can be applied equally to any of the other aspects. It will also be clear that all aspects, features and options described in view of the methods apply equally to the system, device and container, and vice versa.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawings.

DETAILED DESCRIPTION

Figure 1:
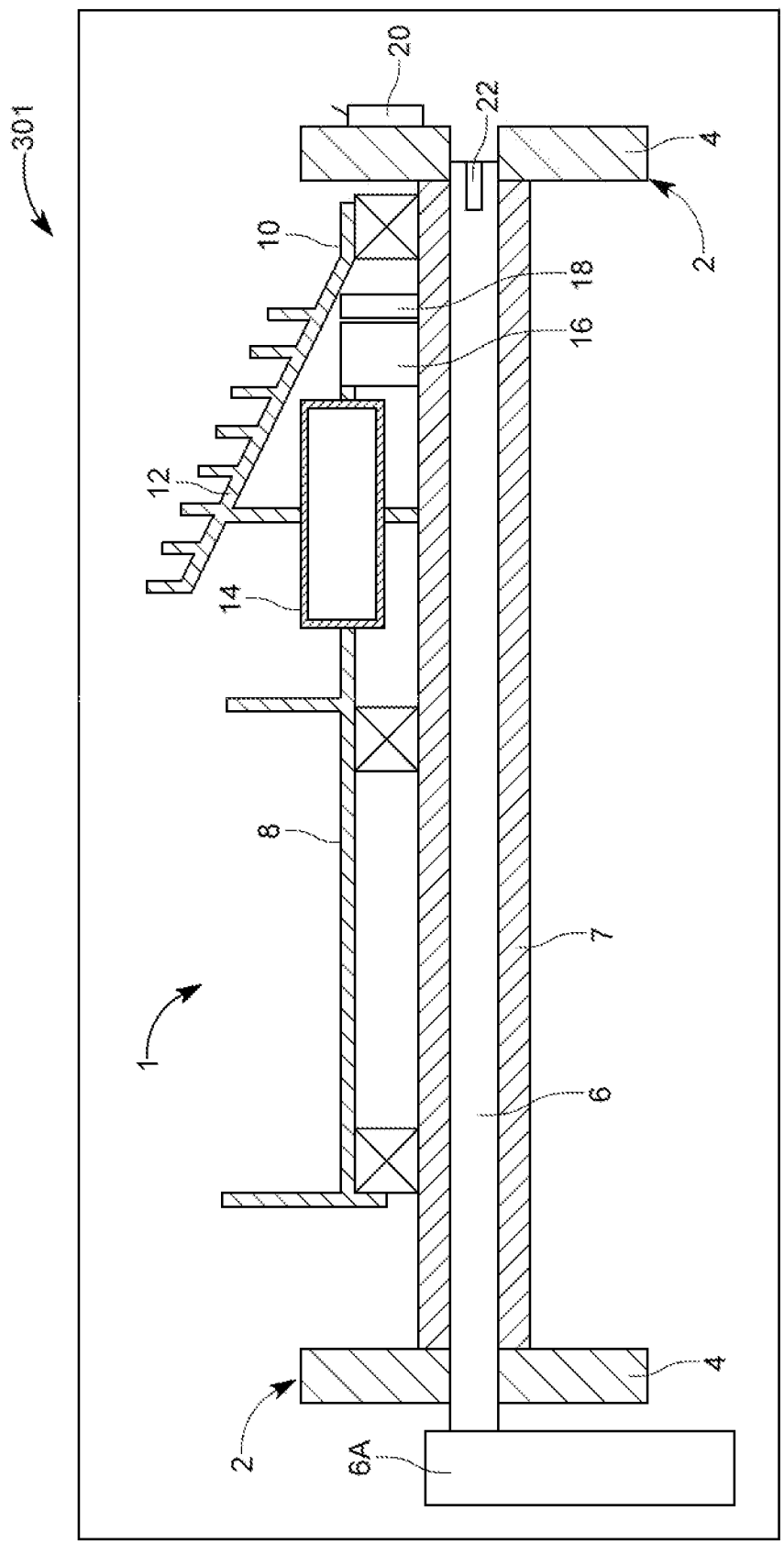
FIG. 1 shows a schematic representation of a cross sectional view taken through a thru-axle of a wheel axle assembly of a bicycle.

FIG. 1 shows a schematic cross section of a wheel axle assembly 1. In FIG. 1 the wheel axle assembly 1 is mounted in a frame 2 of a bicycle 301. Here, the wheel axle assembly 1 is mounted between two dropouts 4 of the frame 2. The wheel axle assembly includes a thru-axle 6 for securing the wheel axle assembly 1 to the frame 2. The thru-axle 6 here is inserted through the hollow axle 7. The wheel axle assembly includes a hub 8. The wheel axle assembly includes a driver 10 for driving the hub in rotation. Here the driver 10 includes a cassette 12 including a plurality of sprocket gears.

In this example, the driver 10 is connected to the hub 8 via a transmission 14. The transmission is arranged to selectively be in a first mode and in a second mode. In the first mode a transmission ratio of the transmission 14 is different from a transmission ratio in the second mode. Here, in the first mode the transmission ratio is unity (output rotation speed at the hub equals input rotation speed at the driver). Here, in the second mode the transmission ratio is a speed reduction (output rotation speed at the hub is smaller than the input rotation speed at the driver). Hence, the transmission can e.g. mimic the functioning of a front derailleur.

In FIG. 1 the wheel axle assembly includes an electric component 16. Here, the electric component 16 is an electric actuator arranged for actuating the transmission to switch from the first mode to the second mode and vice versa. The actuator can e.g. include a processor 16A and a motor 16B. It will be appreciated that the electric component can also e.g. be a sensor, such as a speed sensor.

For operating the actuator 16 a first receiver 18 is placed in the wheel axle assembly 1. Here, the receiver 18 is placed within the cassette 10, e.g. near the actuator 16. A first transmitter 20 is placed on the frame 2. Here the transmitter 20 is placed at the dropout 4. If the wheel including the wheel axle assembly 1 is exchanged the transmitter 20 will remain attached to the frame. Optionally, pairing of the replacement receiver 18' of the replacement wheel with the transmitter 20 ca be achieved by use of the thru-axle 6. The thru-axle 6 can include a tag 22 that can be read out when placing the thru-axle back in the frame 2. The tag causes the replacement receiver to be coupled to the transmitter 20 on the frame 2.

Figure 2A:
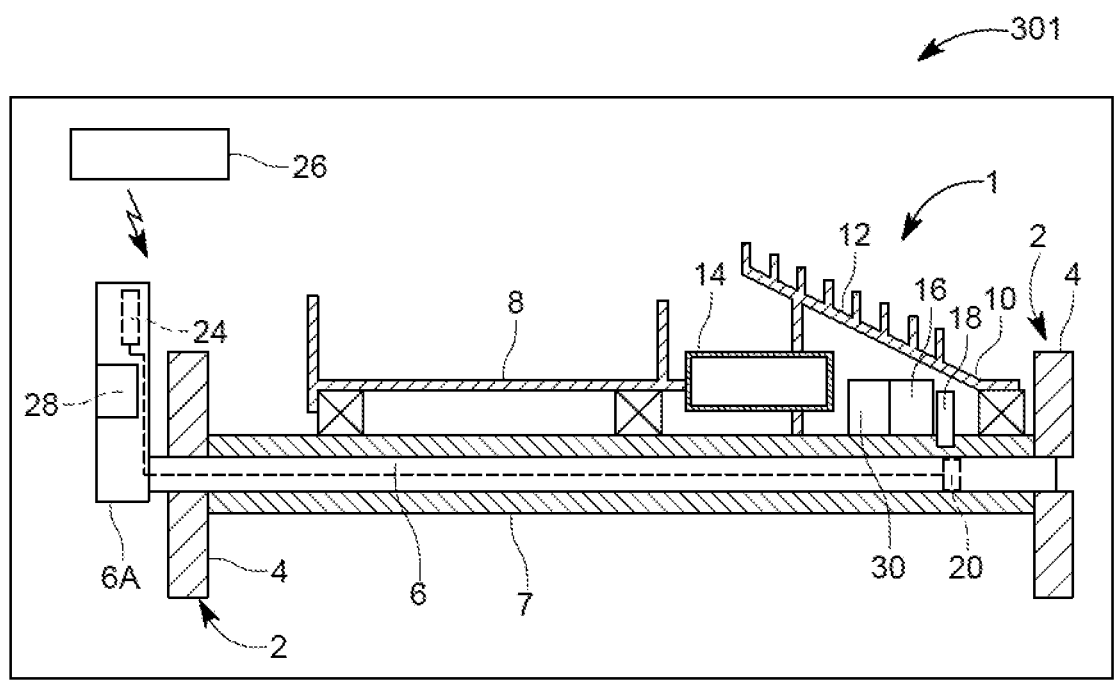
FIGS. 2A and 2B show a schematic representations of a cross sectional views taken through a thru-axle of a wheel axle assembly of a bicycle.
Figure 2B:
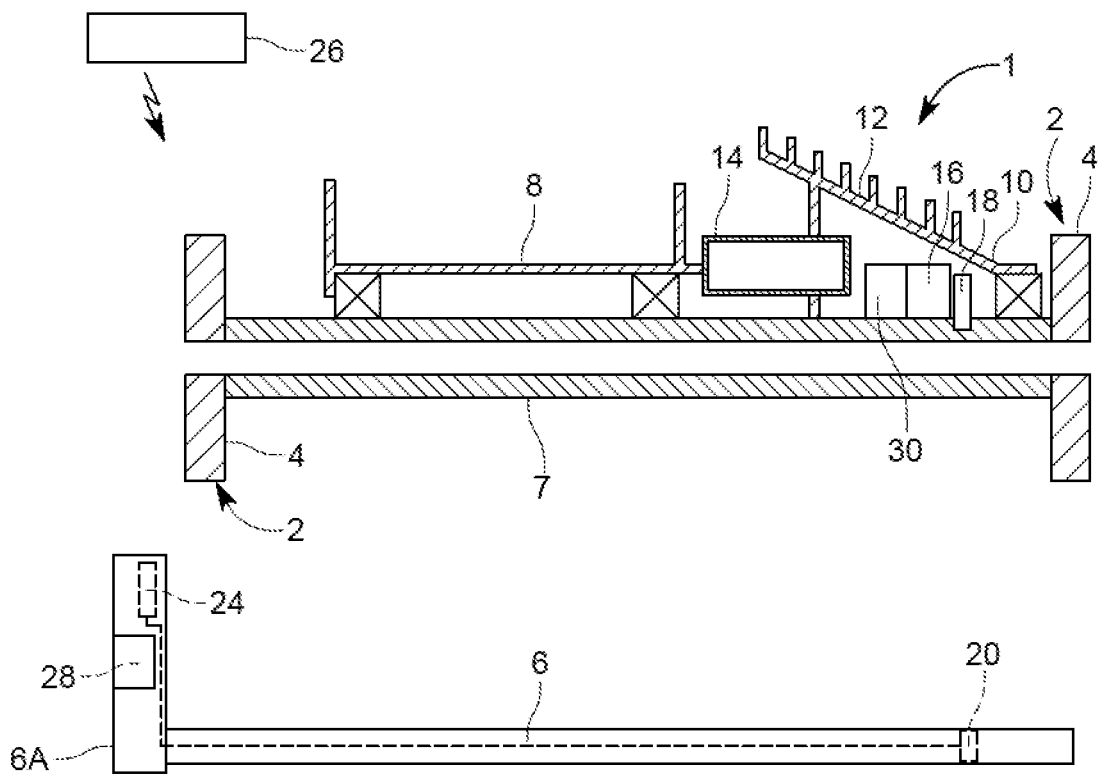
Figure 2C:
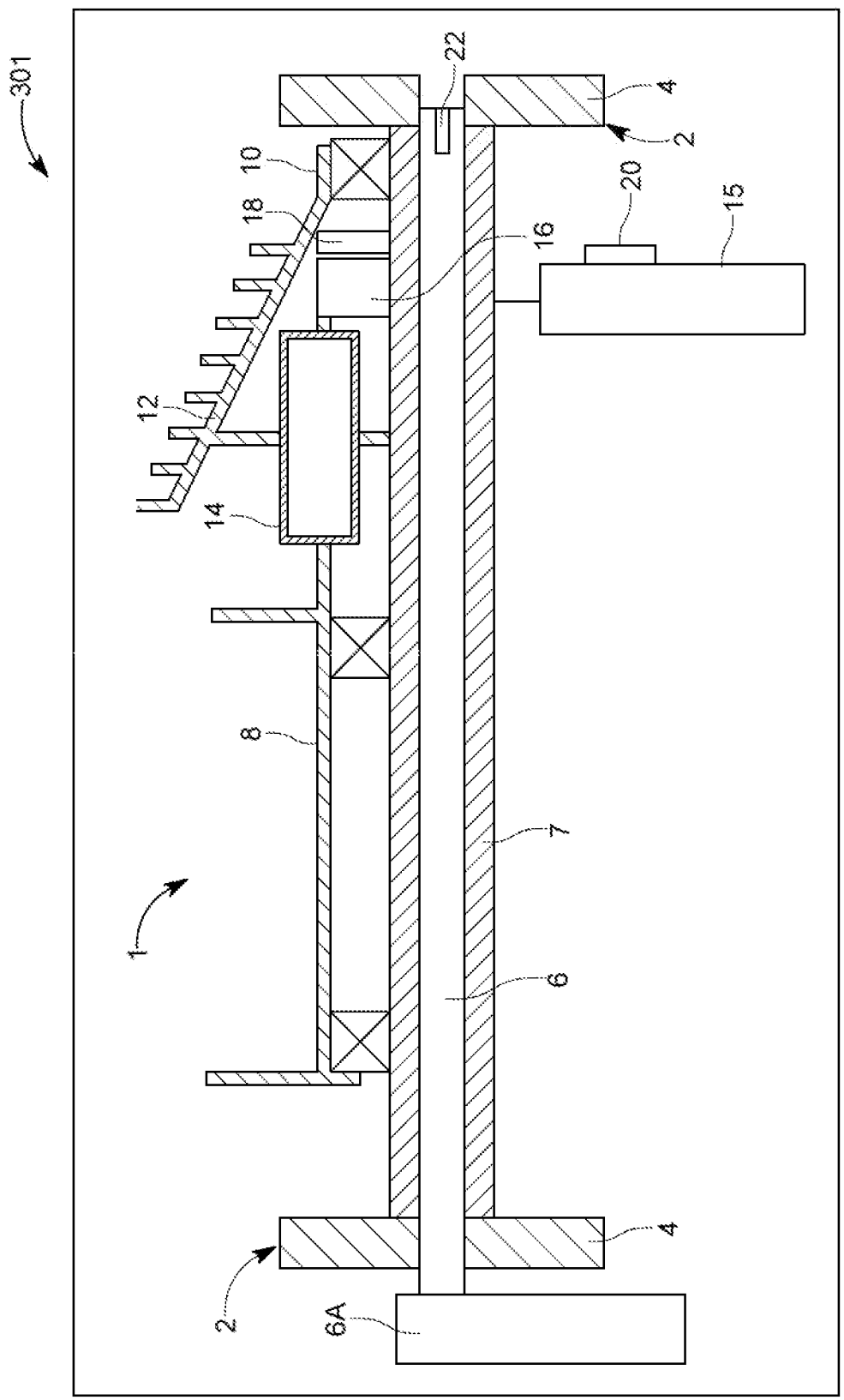
FIG. 2C shows another schematic representation of a cross sectional view taken through a thru-axle of a wheel axle assembly of a bicycle.

FIG. 2A shows a schematic cross section of a wheel axle assembly 1. In this example, the first transmitter 20 is placed in the thru-axle 6. Here, the receiver 18 is placed within the cassette 10, e.g. near the actuator 16, i.e. on the wheel axle. If the wheel axle assembly, or wheel, is exchanged the transmitter 20 remains with the frame 2 since the thru-axle 6 can remain with the frame when exchanging the wheel. Therefore, a pairing between the transmitter 20 and the receiver 18 only needs to be performed once. There is no need for pairing when exchanging the wheel. It is noted that FIG. 2A shows the thru-axle 6 attached to the frame, whereas FIG. 2B shows the thru-axle 6 detached from the frame. FIG. 2C shows an example of the first transmitter 20 mounted to a rear derailleur 15.

Figure 5:
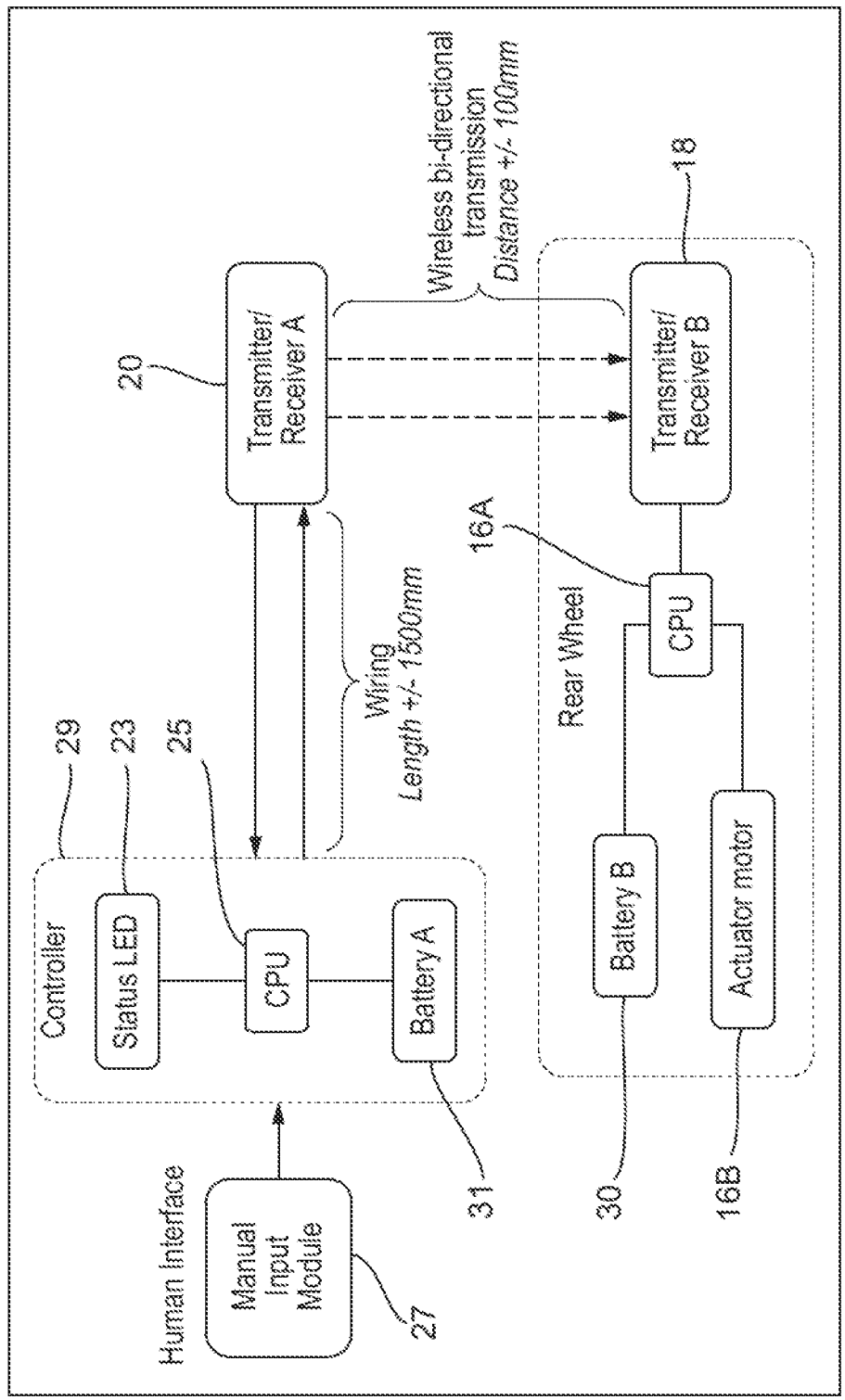
FIG. 5 shows a schematic representation of a system.

In FIG. 2A, the first transmitter 20 is communicatively coupled, here wiredly, with a second receiver 24. The second receiver 24 is in this example arranged for wirelessly receiving a control signal from a second transmitter 26. The second transmitter 26 can be associated with a manual input module 27, such as a shifter, for shifting gears. The shifter 27 can e.g. be mounted on handlebars of the bicycle. The second transmitter can be mounted on the handlebars. Referring to FIG. 5, a controller 29 can include a processor 25 for processing manual input from the module 27. The controller can include indicator means 23 for indicating a status to the user. Hence a user (rider) can trigger transmission of the control signal by actuating the shifter. Alternatively, or additionally, the control signal transmitted by the second transmitter 26 can be automatically generated by a processor, e.g. the processor 25 of the controller 29.

The first transmitter 20 and the second receiver 24 are powered by a battery 28. In this example, the battery 28 is attached to the handle 6A of the thru-axle 6. It is also possible that the battery 28 is included in the thru-axle 6, e.g. within the hollow axle 7. It is also possible that the thru-axle is wiredly connected to the controller 29 on the frame. Then the second transmitter 26 and second receiver 24 can be omitted. Also, the battery 28 can be omitted in case the first transmitter 20 then is powered, e.g. wiredly, from the controller 29 (e.g. from a battery 31 of the controller).

The first receiver 18 is here positioned near the electric component 16. As transfer of signals and/or power is effected over a short distance a short range wireless connection, or first wireless connection, is used, and pairing between the first transmitter 20 and the first receiver 18 is not required. The signals and/or power can be transferred capacitively and/or inductively. A second battery 30, e.g. an ultracapacitor, can be connected to the electric component 16. This battery 30 can provide power, e.g. current, to the electric component 16 for actuation. The second battery 30 can be charged by the first transmitter 20, e.g. using power from the first battery 28. Optionally, the second battery 30 can be used for providing power to the first receiver 18. It is also possible that the first receiver 18 is powered, e.g. directly, by the first transmitter 20. It is also possible that the electric component, e.g. the actuator, is powered, e.g. directly, by the first transmitter 20. The second battery 30 can be selected to last the entire life span of the wheel axle assembly 1. Hence, replacement of the second battery 30 can be avoided. The first battery 28 can charge, via the first transmitter 20 and the first receiver 28, the second battery 30. Hence, the user only needs to take care that the first battery 28 is sufficiently charged. The first battery 28 can be exchangeably mounted to the thru-axle 6 so that it can easily be charged and/or exchanged.

Figure 3:
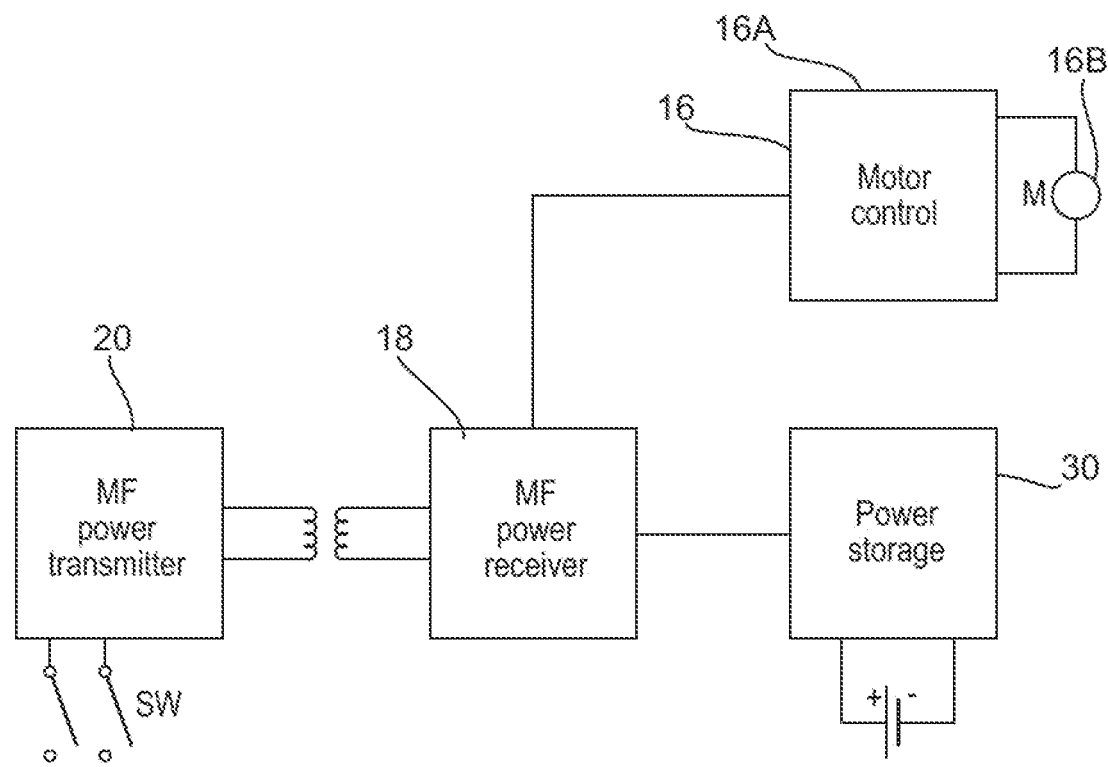
FIG. 3 shows a schematic representation of a system.

Energy transfer between the first transmitter 20 and the first receiver 18 can be in low or mid frequency range. The first transmitter 20 can be a low or mid frequency transmitter. The first receiver 18 can be a low or mid frequency receiver. FIG. 3 shows an example of a midfrequency, MF, transmitter 20 and midfrequency, MF, receiver 18. In the example of FIG. 3 the energy storage 30 can be a battery or supercapacitor. Coupling between the transmitter 20 and receiver 18 can be through coils. the energy transfer can be arranged to indicate an actuation direction of the actuator. The receiver 18 can be arranged to wake up once the first transmitter 20 starts energy transfer. For the wireless energy transfer a frequency in the range of 150-300 kHz can be used. This also provides advantages for the electronics used, such as switching FETs, which only need to be suitable for these relatively low frequencies.

Energy transfer can make of two coupled coils. A first coil 32 can be associated with the first receiver 18 and a second coil 34 can be associated with the first transmitter 20. The coupled coils can be used at the resonance frequency of the two coils. At such resonance frequency a good coupling between the coils can be achieved, even if the coils are not at an optimum position relative to each other. Use can be made of flat coils and/or of concentric coils. The coils allow transfer of sufficient energy for powering the actuator 16, and optionally the receiver 18. The coils allow transfer of sufficient energy for directly powering the actuator 16 without the need for large energy storage in the exchangeable part of the wheel axle assembly. The coils allow for efficient transfer of signals.

Figure 4:
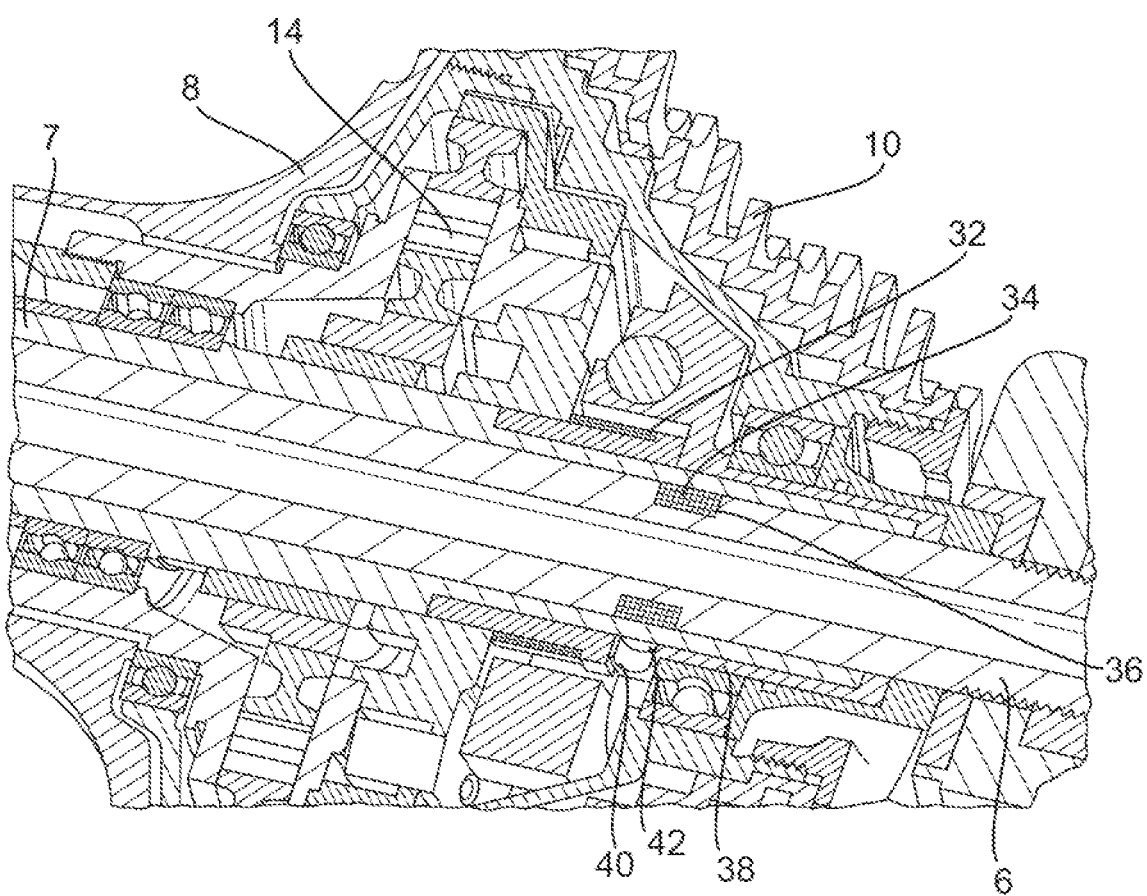
FIG. 4 shows a schematic representation of a cross sectional view taken through a thru-axle of a wheel axle assembly.
Figure 8:
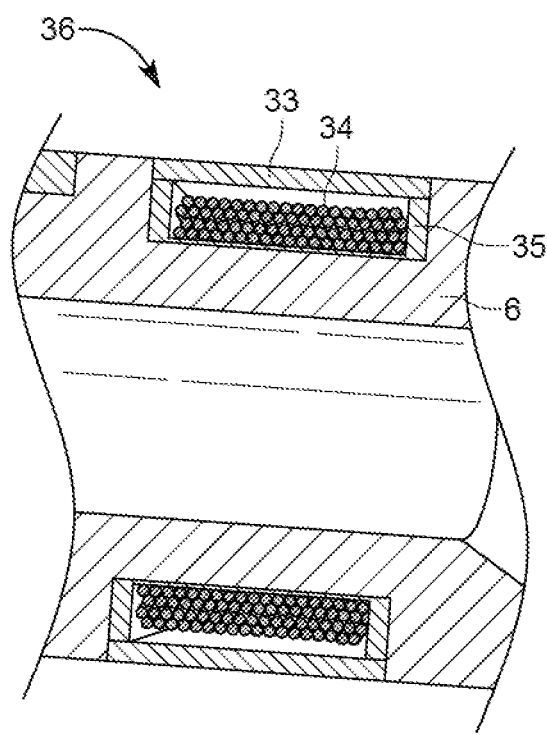
FIG. 8 shows a detail of the view of FIG. 7.

An important aspect is mechanical positioning of the coils. The coils are arranged to be aligned reproducibly, also when exchanging a wheel. The coils are arranged such that metal parts have a minimum impact on signal and/or power transmission. In the example of FIG. 4 the second coil 34 is housed in a circumferential groove 36 in the thru-axle. The coil 34 can be protected from dirt and moisture, e.g. by a suitable potting or covering. In this example, the first coil 32 is enclosed surrounding the hollow axle 7. FIG. 8 shows a detailed view of an example of the second coil 34 in the groove 36. In this example, the coil 34 is covered with a cover 33. Here the cover 33 is made of ferrite. In this example, the coils 34 is housed in a channel shaped insert 35 in the circumferential groove 36. Here the insert 35 is made of ferrite.

Figure 9:
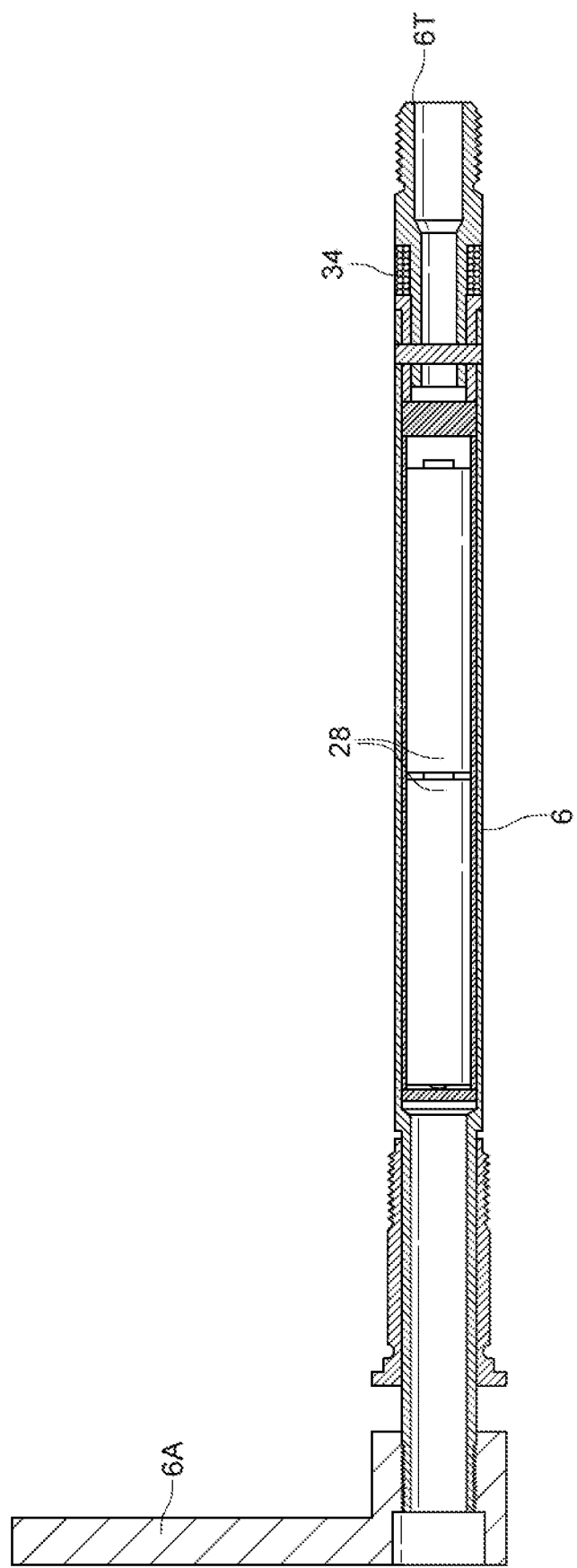
FIG. 9 shows a cross sectional view of a thru-axle.
Figure 10:
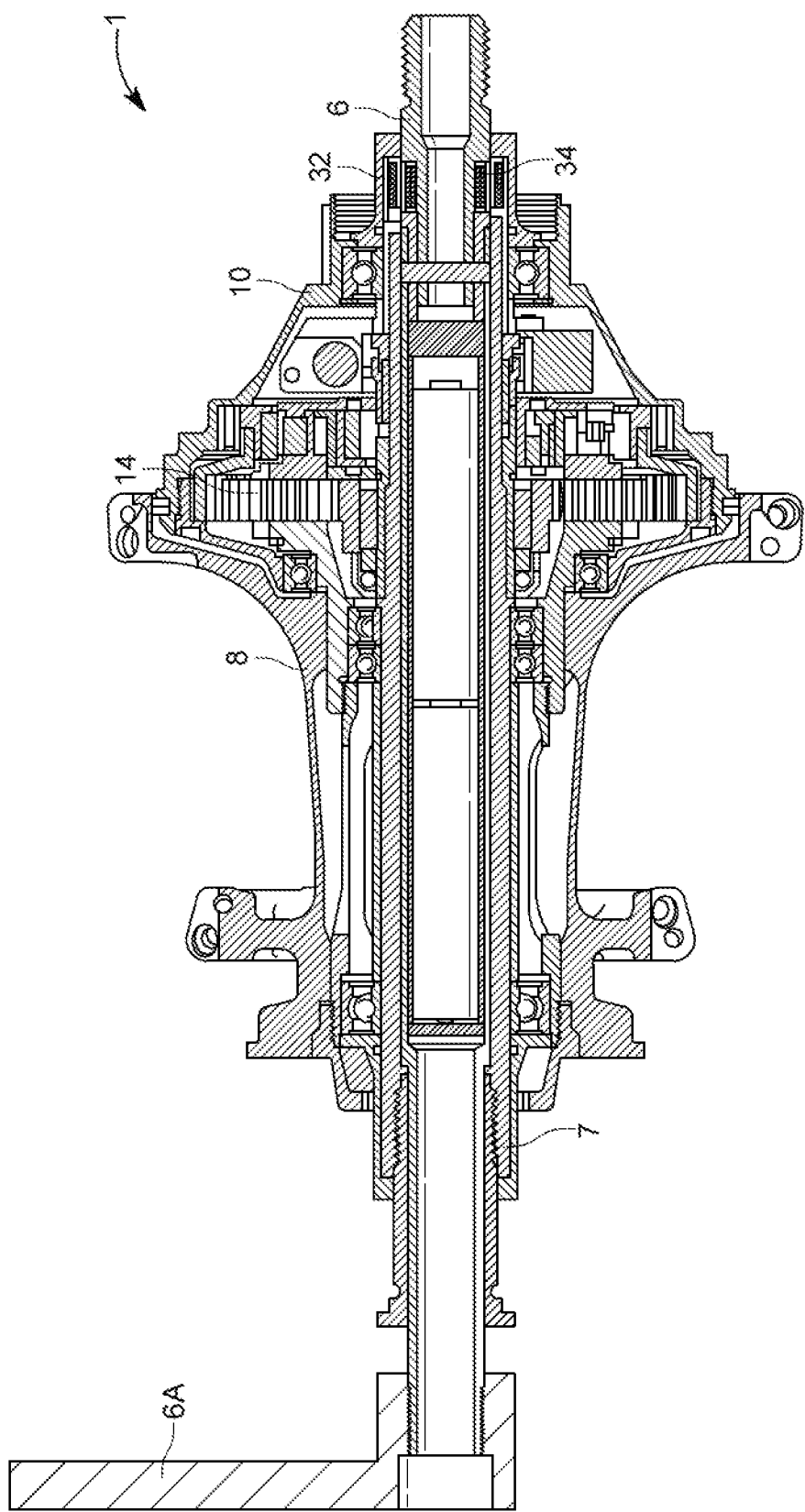
FIG. 10 shows a schematic representation of a cross sectional view of a wheel axle assembly taken through a thru-axle.

FIG. 9 shows an example of a cross section of a thru-axle 6. In this example, the first battery 28 includes two cells. The second coil 34 is placed closer to the tip 6T of the thru-axle than in FIG. 4. FIG. 10 shows an example a cross section of a wheel axle assembly 1. In this example, the wheel axle assembly includes a thru-axle 6 as shown in FIG. 9. In this example, the first coil 32 is positioned with respect to the hub 8 such that the first coil 32 is concentric with the second coil 34 when the thru-axle 6 is mounted to the frame 2 through the hollow axle 7. In this example, a center of the first coil 32 substantially coincides with a center of the second coil 34.

FIG. 5 shows a schematic example of a system. The manual input module 27, e.g. shifter, provides an input to the controller 29. The controller 29 generates a control signal to be provided to the first transmitter 20. In FIG. 5 the first transmitter 20 is wiredly connected to the controller 29. Alternatively it is also possible that the first transmitter 20 is wirelessly connected to the controller 29. Then, the controller 29 includes, or is connected to, the second transmitter 26 and that the second receiver 24 is connected to the first transmitter 20, see e.g. FIG. 2. The second transmitter 26 and second receiver 24 can operate on a long range wireless transmission protocol, or a second wireless connection, such as ANT+, Bluetooth or the like. The transmission system of the second transmitter 26 and second receiver 24 requires no pairing when exchanging a wheel, as the second transmitter 26 and second receiver 24 remain with the frame 2. The second receiver can e.g. be mounted to the thru-axle 6. It will be appreciated that the first transmitter/receiver 20 can include, or be associated with a control unit. This control unit can be arranged for processing control signals from the controller 29. The control unit can be arranged for converting input signals received from the controller 29 into signals to be transmitted to the first transmitter/receiver 18. The control unit can e.g. be arranged for indicating a current direction and/or current level to be transmitted by the first transmitter/receiver 20 to the first transmitter/receiver 18. As shown in FIG. 5, the processor 16A is included in or at the wheel axle. The processor 16A is here arranged for controlling the motor 16B. The processor 16A unit can be arranged for controlling the electric current direction and/or an electric current amount and/or an electric current duration to the motor. The processor 16A can also be arranged for controlling a current, e.g. limiting a current to the motor.

Figure 6:
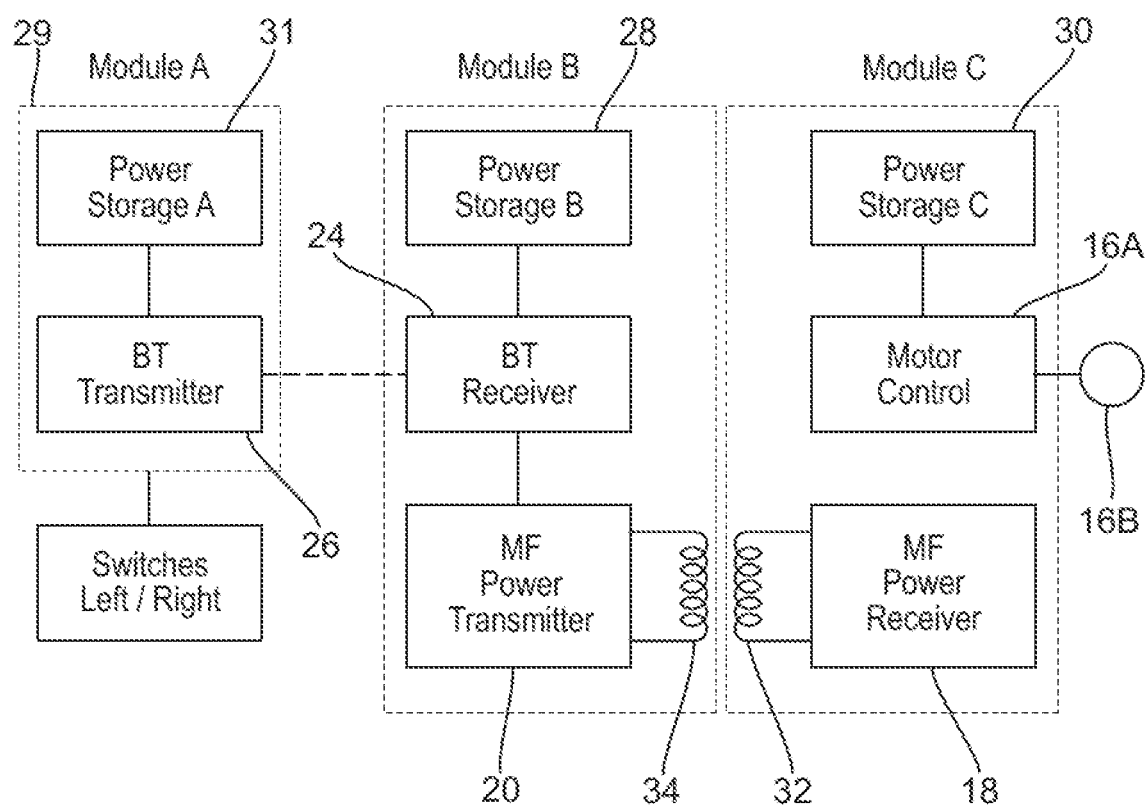
FIG. 6 shows a schematic representation of a system.

FIG. 6 shows a schematic example of a system. Here the controller 29 includes the second transmitter 26, here a Bluetooth transmitter. The controller is connected to the manual input module 27, here switches. Thus, in the module A the switch signal is converted to a Bluetooth signal. The second transmitter 26 is arranged for communicating with the second receiver 24. The second receiver transfers control signals to the first transmitter 20. Thus, the module B receives a Bluetooth signal and transmits a power MF signal. The first transmitter 20 transmits control signals and/or power to the first receiver 18. Thus, the module C receives a power MF signal and provides current to the DC motor.

In this example, when the "left" switch is pressed, the actuator motor should turn clockwise until a mechanical end stop is reached, and when the "right" switch is pressed, the actuator motor should turn counter clockwise until a mechanical end stop is reached, or vice versa. The actuator motor can e.g. be driven at a nominal 3V and 0.3 W.

For the module A, the power Storage A 31 can be a replaceable battery (not necessarily chargeable), for example maximum 1 button cell CR2032 (240 mAh, 3V). Preferably the battery life-time allows for at least 10.000 switch actions in 1 year, which could equate to approximately 500 hrs of biking, at 20 switch actions per hour. The BT Transmitter 26 preferably uses Blue Tooth Low energy protocol. The distance to the receiver 24 is less than 2 m in a normal bicycle. The BT transmitter 26 here is arranged to start transmitting a signal at switch input. Pairing of the BT transmitter 26 to the receiver 24 is possible (at close distance). Preferably secure communication is used between the transmitter 26 and the receiver 24. The controller 29 can be provided with a battery charge indication. The battery charge indication can be arranged to be observable on request. The standby power drain should be low, therefore, the controller 29 can be arranged to enter a sleep-mode when the bicycle is not moving. A movement sensor may thereto be included. Go to sleep time when no movement or switch activation is detected can be 5 minutes or more. The go to sleep time can be user selectable. Wake-up time from sleep by movement of the controller is preferably 1s or less. Preferably, wake-up time by activation of one or more of the switches is 200 ms or less.

Figure 7:
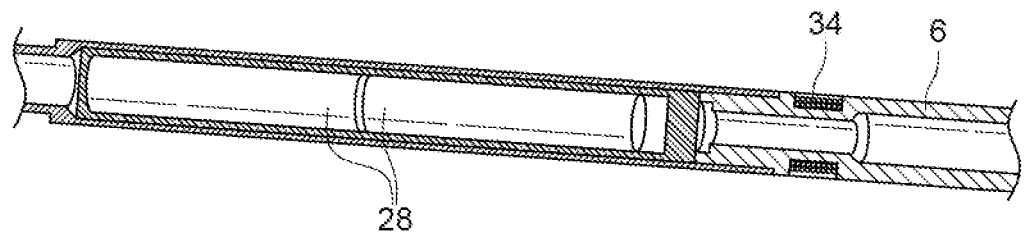
FIG. 7 shows a schematic cross sectional view of a thru-axle in a longitudinal direction.

For the module B, the power storage B 28 can be a chargeable battery (not necessarily replaceable). The battery 28 can e.g. include two AAAA/LR61 Ni-MH cells. FIG. 7 shows an example of two battery cells 28 included in the thru-axle 6. The BT Receiver 24 preferably uses Blue Tooth Low energy protocol. Battery charge indication is possible, e.g. on request. The charge indication of the battery 28 may be provided to the user via the controller 29. The module B can be arranged to enter a sleep-mode when the bicycle is not moving. A movement sensor may thereto be included. The MF power transmitter 20 can be arranged to start transmitting MF (100 kHz) power signal on actuation request of one or more of the switches. The MF transmitter 20 is also arranged to provide charge power to Power Storage C 30 to maintain State-of-Charge of storage 30. The module B can e.g. be housed in a sealed box, preferably water resistant IP67. Charging through a USB or mini-USB cable can be provided.

For the module C, the power Storage C 30 can be a non-replaceable battery, such as a capacitor, e.g. mounted on a PCB. The module C can include the coil 32, here an NFC coil, and the PCB. The PCB can include the electronics for the receiver 18 and motor control 16A. Motor control includes sending current to the DC motor 16B in the requested rotation direction. A mechanical end stop detection can be provided by current feedback. A current limit and maximum actuation duration can be adjustable. The MF power receiver 18 is arranged to receive a MF (100 kHz) power signal and send power to the power storage C 30 and motor control 16A. In an example the PCB can have a full or partial, such as half, circle shape, mounted within a enclosure. The enclosure can contain grease and/or oil.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A bicycle including a frame with a fork, the fork having dropouts between which a wheel axle is mounted, the bicycle including
   a control element,
   a first transmitter placed at the frame, at or in a rear derailleur, or at a thru-axle,
   a second transmitter included as part of the control element,
   wherein the wheel axle includes a first receiver in wireless communication with the first transmitter for receiving a signal and/or electrical power from the first transmitter and an electric component connected to the first receiver for receiving a signal and/or electrical power from the first receiver,
   a second receiver in wireless communication with the second transmitter, and wherein the first transmitter is wiredly connected to the second receiver.

2. The bicycle according to claim 1, wherein the first transmitter is placed at one of the dropouts, or is placed in or on the thru-axle.

3. The bicycle according to claim 2, wherein no pairing is arranged between the first transmitter and the first receiver.

4. The bicycle according to claim 1, wherein the wheel axle includes a transmission between a driver and a wheel hub, wherein the transmission includes a switching mechanism, for switching between a first transmission ratio and a second transmission ratio, including the electric component in the form of an actuator.

5. The bicycle according to claim 4, wherein the electric component is configured to be switched in one of two modes.

6. The bicycle according to claim 5, wherein the electric component is arranged to be switched from one mode to the other by reversing a supply current direction to the electric component.

7. A bicycle including a frame with a fork, the fork having dropouts between which a wheel axle is mounted,
wherein the wheel axle includes a transmission between a driver and a wheel, wherein the transmission includes a switching mechanism, for switching between a first transmission ratio and a second transmission ratio, with an electric component arranged to be actuated,
wherein the electric component is configured to be switched in one of two modes by reversing a supply current direction to the electric component for switching,
wherein the wheel axle includes a first receiver connected to the electric component, and wherein a first transmitter is placed at the frame, at or in a rear derailleur, or at a thru-axle, wherein the first transmitter is in wireless communication with the first receiver for transmitting a signal and/or electric power to the electric component via the first receiver,
the bicycle further including a second receiver wiredly connected to the first transmitter, and a second transmitter included as part of a control element, wherein the second transmitter is in wireless communication with the second receiver.

8. The bicycle according to claim 7, wherein the first transmitter is placed at one of the dropouts, or is placed in or on the thru-axle.

9. The bicycle according to claim 8, wherein a second energy storage element provided at the wheel axle is arranged for charging from a first energy storage element provided at the thru-axle or at the frame, or from a charging device coupled to the thru-axle or to the frame.

10. The bicycle according to claim 8, wherein the first transmitter includes a first coil and the first receiver includes a second coil.

11. The bicycle according to claim 7, wherein the second receiver is powered from a first energy storage element at the thru-axle or at the frame.

\* \* \* \* \*